United States Patent [19]

Dadisman

[11] Patent Number: 4,986,906
[45] Date of Patent: Jan. 22, 1991

[54] SWIMMING POOL WATER PURIFICATION SYSTEM

[75] Inventor: Joseph T. Dadisman, Fort Lauderdale, Fla.

[73] Assignee: Clear & Pure, Inc., Fort Lauderdale, Fla.

[21] Appl. No.: 518,760

[22] Filed: May 1, 1990

Related U.S. Application Data

[63] Continuation-in-part of Ser. No. 256,611, Oct. 12, 1988, abandoned.

[51] Int. Cl.$^5$ .......................... C02F 1/467; C02F 1/50; E04H 4/12
[52] U.S. Cl. .................. 210/169; 210/198.1; 210/243; 210/258; 210/259; 210/295; 210/416.2; 204/228; 204/406; 204/305; 422/22; 422/29
[58] Field of Search ............... 210/169, 243, 258, 259, 210/295, 416.2, 198.1; 204/158, 228, 406; 422/22, 29

[56] References Cited

U.S. PATENT DOCUMENTS

| | | | |
|---|---|---|---|
| 4,119,517 | 10/1978 | Hengst | 204/152 |
| 4,119,520 | 10/1978 | Paschakanais et al. | 204/152 |
| 4,337,136 | 6/1982 | Dahlgren | 210/169 |
| 4,359,030 | 11/1982 | Sone et al. | 204/406 |
| 4,492,618 | 1/1985 | Eder | 210/169 |
| 4,525,253 | 6/1985 | Hayes et al. | 210/169 |
| 4,525,272 | 6/1985 | Henson | 210/149 |
| 4,734,176 | 3/1988 | Zemba, Jr. et al. | 204/228 |
| 4,752,401 | 6/1988 | Bodenstein | 210/169 |

OTHER PUBLICATIONS

Power Field Effect Transistor Motorola TMOS Power MOSFET Data Designers Data Sheet, MTP4N05L,06L, pp. 3-564 to 3-568.

Primary Examiner—W. Gary Jones
Attorney, Agent, or Firm—Malin, Haley, McHale, Dimaggio & Crosby

[57] ABSTRACT

A water purification system including a constant current electrical control system for providing a constant electric current between an anode and cathode in contaminated variable resistance water flowing between the anode and cathode, and a filtering system to remove the clustered particles after the water passes between the cathode and anode. The anode is encircled by a cathode screen with a fluid flow pattern between the anode and cathode to aid the function of the constant current system. In the preferred embodiment, the constant electric current between the anode and cathode is provided by an electrical circuit having an adjustable voltage regulator with the output of the regulator connected to the drain of a Field Effect Transistor, F.E.T., and with the control terminal of the voltage regulator connected to the source of the F.E.T. In addition, the source of the F.E.T. is connected to the anode of the device and the gate of the F.E.T. is electrically biased by a resistor bridge between the drain and the source of the F.E.T. so that the F.E.T. is "on" in a saturated mode.

10 Claims, 2 Drawing Sheets ns. Second,
SWIMMING POOL WATER PURIFICATION SYSTEM This application is a continuation-in-part of application Ser. No. 256,611, filed Oct. 12, 1988, now abandoned.

BACKGROUND OF THE INVENTION

This invention relates to the field of swimming pool water purification systems and more particularly to such systems having separated metal electrodes immersed in swimming pool water and connected to a constant direct current control system to provide a power source connected to each electrode with a particular polarity.

DESCRIPTION OF THE PRIOR ART

It has been estimated that some 500 million people each year are affected by water-associated diseases and that of these, many die. To combat this problem, a variety of methods have been developed to purify water including boiling, chlorination, filtration, ozonation, and ion-production.

Chief among the methods in large scale use today is chlorination. Chlorination has the advantages, under ideal conditions, of ensuring the complete inactivation of all microorganisms, of being cheap, and having some residual effect. However, the disadvantages of chlorination include potentially hazardous health effects including toxicity and mutagenic effects. Additionally, there are problems in determining and applying the correct amount of chlorine product to the water, to achieve optimum results.

With the identification of the problems associated with chlorination, attention has shifted to other means of water purification. In particular, means for disseminating heavy metal ions, principally silver and copper, into water to purify it have been developed in the past because of the antimicrobial effect of these ions.

Various methods and apparatus have been suggested for purifying water using metal ions created by connecting metal electrodes to a current source as shown in U.S. Pat. Nos. 4,337,136-Dahlgren, 4,492,618-Eder, 4,525,253-Hayes et al. Typically, these devices reverse the polarity between the electrodes to reduce errosion and consequent plating of the electrodes.

In addition, filtration of contaminated water is used to remove particulates from water. A problem with filtration systems is that most of the microorganisms responsible for water borne diseases and the food these microorganisms feed on are too small to be trapped by practical filtration means and consequently pass through present day filters unaffected.

Consequently, it is a purpose of this invention to combine the water purification capabilities of constant direct current purification, ion-purification, and filtration in a practical water purification system.

It is another purpose of this invention to provide an improved method to enhance the removing of food for microorganisms from the contaminated fluid or water thereby starving the microorganisms to death.

An additional object of this invention is to combine a constant current electrical control system that is adjustable and a fluid chamber to aid the constant current cathode and anode means, with a filtering system to provide water purification.

In accordance with these and other objects which will be apparent hereinafter, the present invention will now be described with particular reference to the accompanying drawings.

SUMMARY OF THE INVENTION

This invention combines the water purification capabilities of three types of water purifying systems: constant direct current purification; ion-purification; and, filtration in the water purification system.

The disease causing micro organisms are killed in a variety of ways. First, a number of the microorganisms are killed directly by the electric current passing through the water containing the microorganisms. Second, the metal ions, Cu in the preferred embodiment, that are created by the current flowing between the copper anode and the cathode, which in the preferred embodiment is stainless steel, has a toxic effect on the microorganisms that kills a number of them when the anode is made of copper. Some of the copper ions Cu are chemically transformed into $CuO_2$ and $CuH_2Cl$ forms thereafter which is also toxic to many micro organisms. And, third, food particles for the microorganisms that are floating freely in the water passing between the electrodes interact with both the electric current and the strong constant electric field to bind the particles together in relatively larger clusters. The clusters are larger in size than the original individual food particles. The relatively larger clusters of food particles can then be removed from the water in two ways. First, the clusters may be electroplated onto the cathode. It is because of this plating process which captures the food particles that the electrical polarity of the anode and cathode is constant and not reversed as is done in the metal ion purifying systems presently available. Second, any clusters not plated onto the cathode can be moved out of the area between the anode and cathode where they may be trapped in submicron filters for removal from the water system. Without food, the remaining microorganisms cannot survive and multiply. The microorganisms starve to death. This system controls and assists in eliminating the microorganisms in the water system. Elimination of the microorganisms in the water, provides a purifying water system.

This invention is a swimming pool or portable water purification system that includes a constant current electrical control system for an anode and cathode means and a chamber for the water, which will have a variable electrical resistance, to pass rapidly between the anode and cathode means to aid in the clustering of water borne particles. The invention also includes a filtering system to allow filtering of the undesirable particles including the clustered particles. The anode is encircled by a cathode screen in a cylindrical canister having a fluid flow pattern that aids the function of the constant current system. The constant current electrical control system includes means for providing quick response in order to pass a constant direct electric current through the contaminated water having variable resistance which is flowing between the electrodes.

Passing direct current through contaminated water has several effects. First, food particles for the microorganisms that are floating freely in the water passing between the electrodes interact with both the electric current and the strong constant electric field to bind the particles together in relatively larger clusters. The clusters are larger in size than the original individual food particles. The relatively larger clusters of food particles can then be trapped in submicron filters for removal from the water system. Without food, the remaining microorganisms cannot survive and multiply. Thus, the microorganisms starve to death. A means is then provided downstream of the electrodes for filtering these resulting clusters of the food which are needed by disease causing microorganisms for sustaining life in the contaminated water.

Another effect of passing direct current through the water between metal electrodes made of copper is that copper and copper chemicals are released into the water which are toxic to many disease causing organisms. This occurs in the following sequence: first, copper ions, Cu, are created and released into the water by the electric current flowing between the electrodes as the anode, which is made of copper in the preferred embodiment, dissolves. The Cu ions have a toxic effect on many of the microorganisms killing many of them. Second, a certain percentage of CU ions form $CuO_2$ in the water. From the $CUO_2$, a certain amount of $CuH_2Cl$ forms which is also toxic to a number of disease causing organisms. The dead micro organisms are incapable of causing disease.

It should be noted in this context that in contrast to the water purification devices which reverse polarity between the electrodes in order to prevent the errosion and consequent plating of the electrodes, the instant device encourages the errosion of the anode, which is preferably made of copper, in order to maximize the number of copper ions, Cu, and consequently other copper compounds in the water.

A further effect of passing a direct electric current through contaminated water is that a certain number of micro organisms may be directly killed by the electric current.

The system includes means for moving water from the water reservoir through the fluid chamber which contains the current interaction device including the cathode and anode, and then through a filter for removing submicron sized particles. The fluid is thereafter returned to the reservoir. The cathode and anode in the current interaction container device allows the fluid to pass through an electrical field of approximately one foot in length. The cathode is preferably a screen shaped cylinder that surrounds an anode that is smaller in length. The input and output are preferably on opposite sides of the anode, inside the cathode screen. The chamber, in the preferred embodiment is cylindrical shaped and has the water input and output at one end. In addition, the chamber has a concave shaped end opposite the input and output end to aid the fluid flow.

The electrical field is created by a constant current flowing between the anode and cathode controlled by a constant current control system. This system maintains a constant current flow even though the resistance of the water passing through the electrical field changes constantly. The constant current control system utilizes a power F.E.T. with a controllable voltage regulator having its output connected to one side of the F.E.T. and the voltage regulator control connected to the other side of the power F.E.T. to maintain the constant current.

DESCRIPTION OF THE PREFERRED EMBODIMENT

Figure 1:
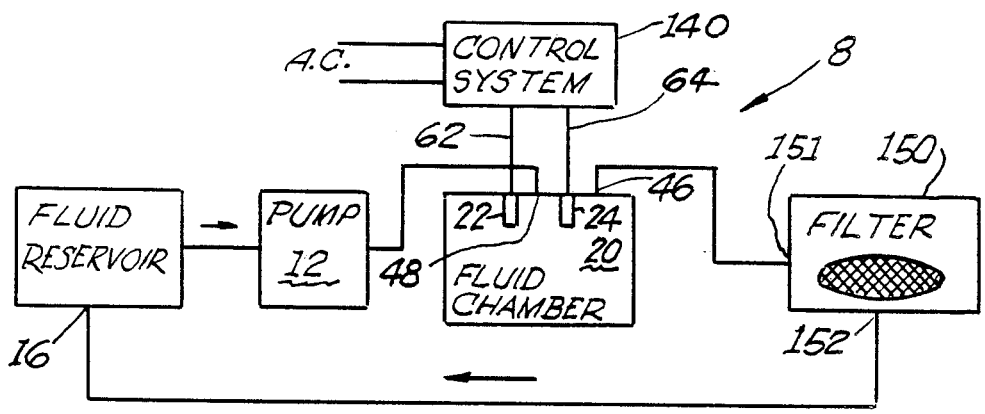
FIG. 1 is a block diagram of the invention.

Referring now to the drawings, FIG. 1 shows a block diagram of the invention generally labeled 8. A reservoir 10, which may be a swimming pool or other source of contaminated water is connected to a pump 12 which pumps the water from reservoir 10 into fluid chamber 20. In chamber 20, separated metal electrodes 22 and 24 are immersed in the contaminated water. The fluid chamber 20 is connected to a constant direct current control system 140 to provide a constant electrical current between electrode 22 and 24. The interaction of food particles for microorganisms in the water with the constant electric current causes, among other things, the food particles to bind together in large enough clusters to be trapped in a filter 150 which is located downstream from chamber 20. The water flowing out of the filter 150 is relatively purified in comparison to the contaminated water entering chamber 120. Filter 150 is connected back to the fluid reservoir 10 so that a complete fluid circuit is formed.

Figure 2:
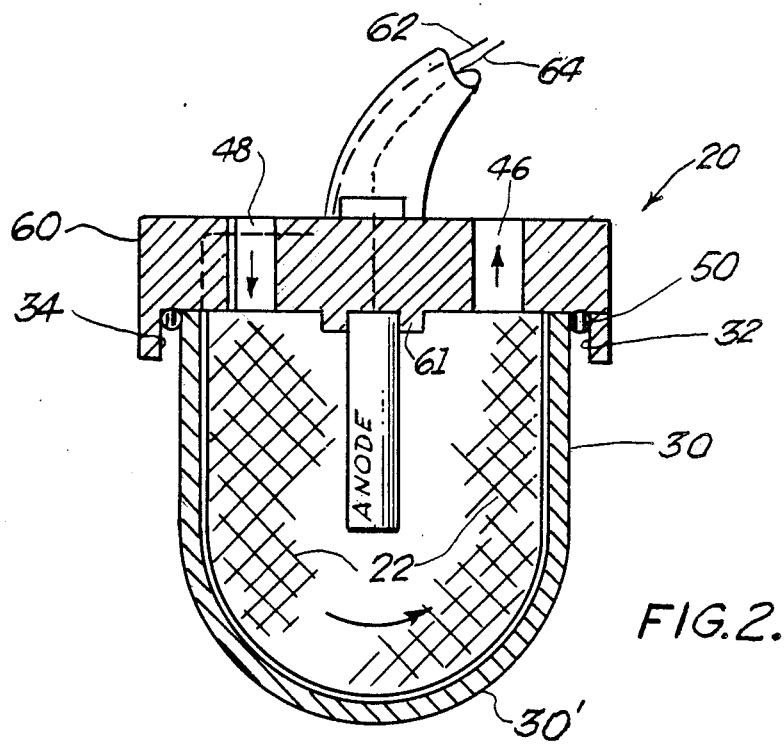
FIG. 2 is a cross sectional view of the fluid chamber including the anode and cathode and showing the path of the contaminated water as it passes between the anode and cathode.
Figure 3:
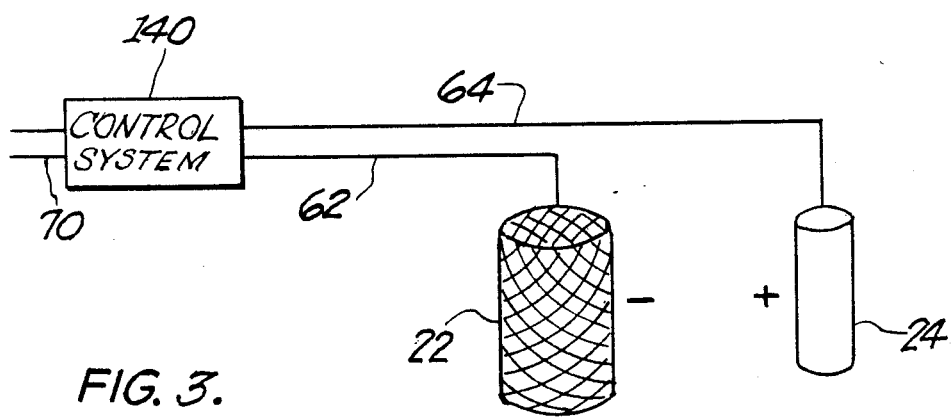
FIG. 3 is a schematic diagram of the anode and cathode connected to the control system.

Chamber 20 is composed of two parts: a "head" assembly 60 through which all the components in chamber 20 are attached, and a cylindrical canister 30. A detailed illustration of chamber 20 is shown in FIG. 2.

Protruding downward from the "head" assembly 60, is a solid electrode, the anode 24 preferably made of copper, and a mesh electrode, the cathode 22, which is partially illustrated. Cathode 22 is a cylindrical, electrically conducting mesh which surrounds anode 24. The anode 24 is positioned in a flange 61 to protect the connected end. A bolt or screw may be used to secure anode 24 in position relative to the flange 61 to hold it in place. As can be seen in FIG. 2, wire 62 is attached to cathode 22 and wire 64 is attached to anode 24 within the body of the "head" assembly 60. A grommet may provide a water-tight seal around wires 64 at the point of exit from the "head" assembly 60.

When it its operational form, both cathode 22 and the anode 24 are entirely surrounded by the cylindrical canister 30 which is attached to the "head" assembly 60 by the inter-meshing of tapered threads 32 with corresponding grooves 34 in "head" 60. A flexible "O" ring 50 seats between canister 30 and "head" 60 providing a water-tight seal between the inside and outside of canister 30 and "head" 60.

In the preferred embodiment, water inlet 48 and outlet 46 are in the head 60 and direct the water into the space between the anode 24 and cathode 22. Inlet 48 and outlet 46 are located on opposite sides of anode 24 in head 60. Opposite inlet 48 and exit 46 in canister 30 is a concave wall 30, The shape of wall 30' facilitates a smooth flow of fluid inside canister 30 that prevents an accumulation of foreign material in canister 30. The fluid flow from the inlet 48 to the outlet 46 is shown by the arrow identified as numeral 31. The contaminated fluid with particles or items is carried along one side of the cathode 22 around the tip of the anode 24 and back along the other side of the cathode 22 to allow the fluid to pass through an electrical field which is approximately one foot in length.

The water leaves chamber 20 after interacting with the direct electrical current between cathode 22 and anode 24 through outlet 46 under pressure from pump 12 and proceeds to the filter 150.

A filter 150 is provided downstream for filtering the resulting clusters of the food needed by disease causing microorganisms for sustaining life in the contaminated water. Any well known filter system with replaceable filters may be used. It has been found that filters that filter particles in the range of between 0.5 and 1.5 microns are particularly effective in this system. The fluid is returned from filter 150 to the reservoir 16 through line 9.

The swimming pool water purification system 8 includes a constant current electrical control system 140 for anode 24 and cathode 22. The constant current electrical control system 140 includes means for quickly responding to changes in electrical resistance in the contaminated water between anode 24 and cathode 22 in order to provide a constant direct electric current through the contaminated water between the anode 24 and cathode 22.

Figure 4:
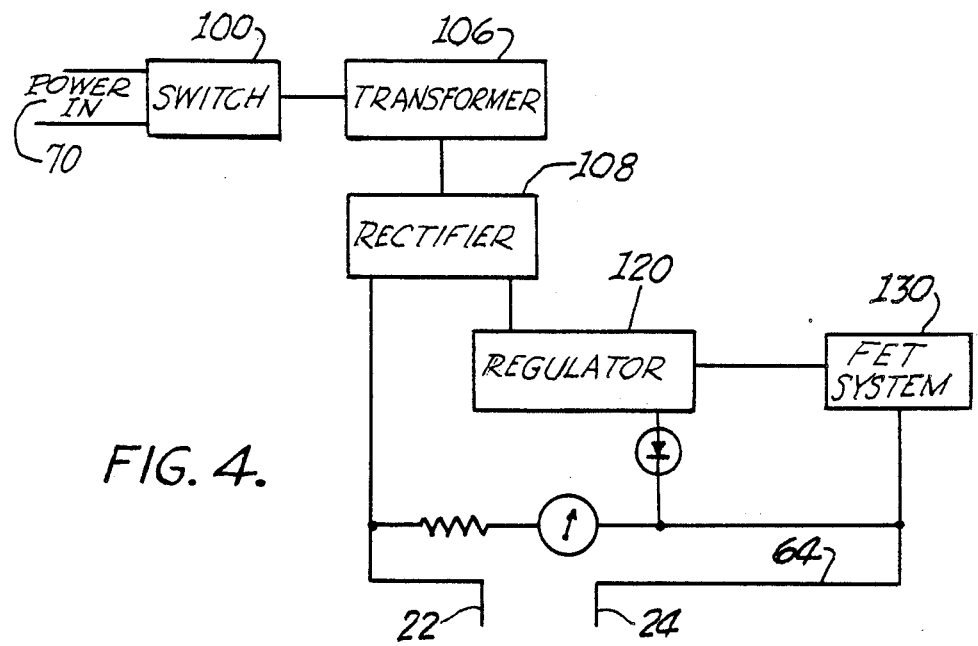
FIG. 4 is a block diagram of the control system providing the constant current between the electrodes.

FIG. 4 shows a block diagram of the circuitry that provides a constant electrical current between cathode 22 and anode 24. The source of the electrical current between cathode 22 and anode 24 is from the control circuit generally labelled 140 which is connected to the electrodes 22 and 24. The anode 24, is maintained at a positive electrical potential relative to cathode 22. Of course, cathode 22, is then correspondingly negative with reference to anode 24. The control system provides a constant electric current between the cathode 22 and anode 24 from commercially available AC electricity as represented by 70. The control system 140 includes means that rapidly adjust itself to provide a constant current between cathode 22 and anode 24 as water with variable resistance passes between the electrodes.

Figure 5:
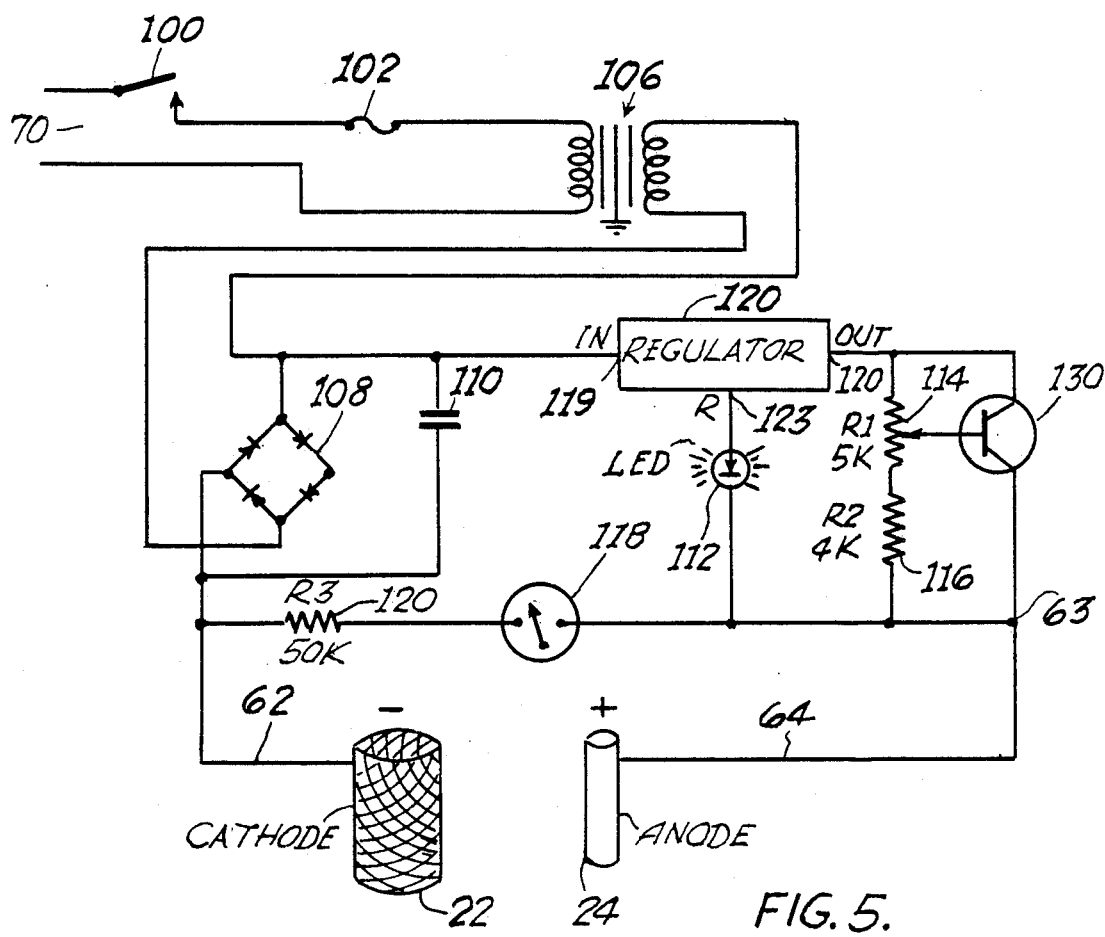
FIG. 5 is a schematic diagram of one embodiment of the constant current generator or control system.

FIG. 5 is an electronic schematic showing one embodiment of a constant current generator in the control system 140. The input source 70 of AC current may be from any commercially available source. The alternating input voltage passes through the main power switch 100, fuse 102, and a meter 104, if desired, before entering the primary coil of a transformer 100. Transformer 106 reduces the line voltage provided by input 70 to between 11-30 volts. This alternating current at 11-30 volts then passes through a full wave rectifier system 108 including capacitor 119 of 1000-500 microfarads for converting the alternating current into direct current.

A controllable voltage regulator 120 is provided. The regulator has input 119 and output 121. Input 119 is connected to the output of the full wave rectifier system 108 and the output 121 is connected to the drain of the F.E.T. Control line 123 is connected through LED to the source 63 of the F.E.T. to provide almost instantenous control when the water resistance varies between the cathode 22 and anode 24. Resistor R2, 116 in conjunction with the variable resistor R1, 114 provides a biasing function for the gate of the F.E.T. R1 may be varied to adjust the control system to various pool environments, or current setting. LED 112 shows that the solid-state voltage regulator in the control system 140 is powered up. Meter 118 and resistor R3, 120 are to ensure calibration of the system. Wire 62 is connected to the negative side of the full-wave rectifier 108. This negative potential is transferred to the cathode 22 when the invention is in operation. The voltage at source 63 is positive with respect to the cathode when the F.E.T. 130 is operating.

When the resistor 114 is adjusted so that the voltage at the gate of F.E.T. 130 is higher than the forward biasing voltage to the source 63, current will flow through the F.E.T. from the drain to the source. The resistance in series of resistors 114 and 116 is chosen to be small compared to the resistance of the contaminated water between anode 24 and cathode 22. Consequently, the voltage at the source 63 will be relatively close to the output voltage of the voltage regulator 120. Because wire 64 has virtually no resistance, this will be the voltage present at the anode 24.

The regulator 120, LED 112, R1, 114, R2, 116, and the F.E.T. 130 work together as described below to ensure that a constant electrical current flows through source 63 and consequently through the water between cathode 22 and anode 24. This occurs because the regulator control 123 is connected to source 63. A decrease in resistance in the water between cathode 22 and anode 24 will cause the F.E.T. 130 to act as a larger resistance almost instantenously to maintain a constant current across the cathode 22 and anode 24. An increase in resistance in the water will cause the F.E.T. 130 to act as a smaller resistance almost instantaneously which will also maintain a constant current across the cathode 22 and anode 24.

It is a well known property of F.E.T.'s that once the saturation region of the F.E.T. is reached, the current flowing through the F.E.T. will be essentially constant for fixed values for the difference in the gate and source voltage, despite the voltage difference between the drain and source. This difference voltage is called $V_{GS}$. A reduction in $V_{GS}$ results in a reduction in current flowing through the F.E.T., while an increase in $V_{GS}$ results in an increase in current through the F.E.T.

In the circuit shown in FIG. 5, $V_{GS}$ is a function of a voltage divider circuit made up of $R_1$, 114, $R_2$ 116 and the resistance of the contaminated water. Ordinarily, the resistance of the water will be quite high, but as previously mentioned, is quite variable. When the resistance of the water decreases, the effect of the voltage divider is to drop the voltage at the gate of the F.E.T. This reduction in gate voltage causes a corresponding reduction in current flowing through the F.E.T. However, because the resistance of the water is decreased, the electric current flowing through the water between the anode 24 and cathode 22 will remain constant.

In addition, any change in resistance between the cathode 22 and anode 24 will cause the voltage between the cathode 22 and anode 24 to change according to Ohms Law: $V = IR$. Because the voltage at the anode 22 is the same as the voltage at the source 63, and because source 63 is connected to the regulator control 123, any change in voltage at the anode 24 will cause a change in voltage at the regulator control 123. A change in voltage at the regulator control 123 will cause the voltage at the output 121 of the regulator 120 to move either up or down corresponding to the change in voltage at the source 63, so that the voltage at the regulator control 123 will move to a voltage to produce a constant output current. This raising or lowering the voltage at output 121 will cause more or less current to flow through the resistor network according to Ohm's Law. This effect is in addition to and in cooperation with the constant current effect of the F.E.T. described above. The net effect of both effects is that a constant electric current will flow between the anode 24 and cathode 22.

The constant current control system 140 is connected to the anode 24 and cathode 22 in chamber 20 through electrically conducting wires 62 and 64.

As is shown in FIG. 1, water from a reservoir 10 is moved through the system by a pump 12 eventually returning to the reservoir 10 through line 9. Pump 12 is shown in a configuration between the reservoir 10 and the fluid chamber 20. The filter system 150 is downstream of the pump 12. The particular position of the pump 12 is not critical so long as water flows from the reservoir 10 through the system and back into the reservoir 10.

It should be noted in connection with the operation of this system that copper has an an errosion rate of 2.374362 grams per ampere hour. The anode 24 in the preferred embodiment of the instant invention is made of copper. The anode 24 will erode into copper ions in the contaminated water. Because the errosion rate is related to the current, current is the determining factor of production of Cu ions. With this in mind, an increase in voltage does not increase production of ions. However, if the circuit exceeds about 30 volts, the system produces a copper acid which is not desirable to have in the system. Therefore the system must be operated below 30 volts.

To treat a 15,000 gallon pool, it has been found that an average of one pound of copper must be eroded into Copper ions. This works out to be about 192 amp hours of operation.

In operation, the electrons flowing across the fluid may kill a certain amount of bacteria. In addition, a certain amount of copper will move into the waters copper ions, Cu. A percentage of Cu ions will be chemically transformed into $CuO_2$. Some of these $CuO_2$ molecules will be converted to $CuH_2Cl$. Some of these will convert back to $CuO_2$ or $CuO$ which results in an equilibrium of Cu ions, $CuO_2$, and $CuH_2Cl$ molecules. The molecules are toxic to a number of disease causing micro organisms, thus causing their death. These dead organisms may then be removed by filter 150. This will account for over 90% of the removal of the contaminating particles.

Further, interaction between food particles for disease causing micro organisms and the constant electrical current between the anode 24 and cathode 22 will cause the food particles to cluster together. The clusters will be removed from the system by either being plated onto the cathode or by being removed by passing through a submicron filter 150. These clusters are larger in size than the individual food particles. The increased size of the clusters allows them to be filtered out of the water by filter 150 where, without clustering, the individual food particles would pass through filter 150. With the food particles removed, the micro organisms starve to death.

The anode and cathode function may vary with applied magnetic fields and other ionization radiation fields including but not limited to alpha, beta and gamma radiation.

The present invention has been shown and described herein in what is considered to be the most practical and preferred emodiment. It is recognized, however, that departures may be made therefrom within the scope of the invention and that obvious modifications will occur to a person skilled in the art.

What is claimed is:

1. A water purifying system comprising:
   an electrode system, comprising an anode and a cathode, said electrode system being immersible in a fluid;
   means for providing a constant electrical current between said anode and said cathode despite changes in electrical resistance in said fluid;
   means for facilitating ionic erosion of said anode into said fluid;
   means for facilitating plating on said cathode whereby food particles clustered together in response to the interaction between said food particles and said constant electric current are plated on said cathode along with ions from said fluid resulting from said ionic erosion of said anode;
   means for filtering fluid which has passed through said constant electrical current between said anode and said cathode; whereby food particles for micro organisms in said fluid which have clustered together in response to the interaction between said food particles and said constant electric current flowing between said anode and said cathode and which food particles have not been removed from said fluid by said plating on said cathode are further removed from said fluid.

2. A water purifying system as claimed in claim 1 further comprising a reservoir of fluid.

3. A water purifying system as claimed in claim 1 further comprising means for circulating fluid between said anode and said cathode and then through said means for filtering fluid.

4. A water purifying system as claimed in claim 1 wherein said cathode is a mesh-type screen surrounding said anode.

5. A water purifying system as claimed in claim 1 wherein said means for providing a constant electrical current between said anode and said cathode includes:
   an adjustable voltage regulator having an input, output, and a control terminal whereby the output voltage of said regulator at said output is determined in response to a voltage present at said control terminal;
   a Field Effect Transitor whose drain is connected to said output of said voltage regulator, whose source is connected to said control terminal of said voltage regulator and said anode, and whose gate is electrically biased by a resistor bridge between said drain and said source so that Field Effect Transistor is turned on in a saturated mode.

6. A water purifying system comprising:
   a reservoir of contaminated fluid;
   an electrode system comprising an anode surrounded by a mesh-type screen cathode, said electrode system being immersible in fluid from said reservoir;
   means for providing a constant electrical current between said and said cathode despite changes in the electrical resistance in said fluid;
   means for facilitating ionic erosion of said anode into said fluid;
   means for facilitating plating on said cathode whereby food particles clustered together in response to the interaction between said food particles and said constant electric current are plated on said cathode along with ions from said fluid resulting from said ionic erosion of said anode;
   means for filtering fluid which has passed through said constant electrical current between said anode and said cathode, whereby food particles for micro organisms in said fluid which have clustered together in response to the interaction between said food particles and said electric current flowing between said anode and said cathode and which food particles have not been removed from said fluid by said plating on said cathode are further removed from said fluid;

means for circulating said fluid from said reservoir, between said anode and said cathode, and then through said means for filtering.

7. A water purifying system comprising:

a reservoir of contaminated fluid;

an electrode system comprising an anode surrounded by a mesh-type screen cathode, said electrode system being immersible in fluid from said reservoir;

means for providing a constant electrical current between said anode and said cathode including:

an adjustable voltage regulator having an input, output, and a control terminal whereby the output voltage of said regulator at said output is determined in response to a voltage present at said control terminal.

a Field Effect Transistor whose drain is connected to said output of said voltage regulator, whose source is connected to said control terminal of said voltage regulator, and whose gate is electrically biased by a resistor bridge between said drain and said source whereby said gate of said Field Effect Transistor is biased so that said Field Effect Transistor is turned on in a saturated mode;

means for facilitating ionic erosion of said anode into said fluid;

means for facilitating plating on said cathode whereby food particles clustered together in response to the interaction between said food particles and said constant electric current are plated on said cathode along with ions from said fluid resulting from said ionic erosion of said anode;

means for filtering fluid which has passed through said constant electrical current between said anode and said cathode, whereby food particles for micro organisms in said fluid which have clustered together in response to the interaction between said food particles and said constant electrical current flowing between said anode and said cathode and which food particles have not been removed from said fluid by said plating on said cathode are further removed from said fluid;

means for circulating said fluid from said reservoir, between said anode and said cathode, and then through said means for filtering.

8. A water purifying system as claimed in claims 1, 6 or 7 wherein said means for filtering fluid includes a filter which filters particles of submicron size.

9. A water purifying system as claimed in claims 1, 6 or 7, wherein said anode is made of copper.

10. The device of claims 1, 6 or 7 wherein said means for facilitating plating includes:

an adjustable voltage regulator having an input, output, and a control terminal whereby the output voltage of said regulator at said output is determined in response to a voltage present at said control terminal;

a Field Effect Transistor whose drain is connected to said output of said voltage regulator, whose source is connected to said control terminal of said voltage regulator and said anode, and whose gate is electrically biased by a resistor bridge between said drain and said source so that said Field Effect Transistor is turned on in a saturated mode;

whereby said anode is maintained at an electrically positive potential relative to said cathode such that ions eroded from said anode into said fluid will be plated into said cathode.

* * * * *